(12) United States Patent
Cunningham et al.

(10) Patent No.: US 7,819,054 B2
(45) Date of Patent: Oct. 26, 2010

(54) SOLAR-POWERED WASTE COMPACTOR, METHOD OF POWERING A WASTE COMPACTOR, AND HYDRAULIC UNIT THEREFOR

(75) Inventors: James P Cunningham, Columbus, MS (US); James K Robbins, Fayette, AL (US)

(73) Assignee: Marathon Equipment Company, Vernon, AL (US)

( * ) Notice: Subject to any disclaimer, the term of this patent is extended or adjusted under 35 U.S.C. 154(b) by 392 days.

(21) Appl. No.: 11/826,372

(22) Filed: Jul. 13, 2007

(65) Prior Publication Data

US 2009/0013882 A1 Jan. 15, 2009

(51) Int. Cl.
*B30B 15/16* (2006.01)
(52) U.S. Cl. .................... 100/50; 100/269.01
(58) Field of Classification Search ............... 100/214, 100/215, 229 R, 226, 229 A, 269.01, 269.03, 100/269.08, 48, 50
See application file for complete search history.

(56) References Cited

U.S. PATENT DOCUMENTS 2,200,495 A * 5/1940 Fife .................... 252/79

| 7,000,532 | B2 | 2/2006 | Imperato |
| 7,007,598 | B1 | 3/2006 | Patras |
| 7,124,680 | B2 | 10/2006 | Poss et al. |
| D564,545 | S | 3/2008 | Poss et al. |
| 7,481,159 | B2 | 1/2009 | Poss et al. |
| 2007/0209529 | A1 | 9/2007 | Poss et al. |
| 2008/0067227 | A1 | 3/2008 | Poss et al. |
| 2008/0257993 | A1 | 10/2008 | Cole et al. |
| 2009/0013882 | A1 | 1/2009 | Cunningham et al. |

FOREIGN PATENT DOCUMENTS

ES 2 214 944 A1 9/2004

* cited by examiner

*Primary Examiner*—Jimmy T Nguyen
(74) *Attorney, Agent, or Firm*—Berenato & White, LLC

(57) ABSTRACT

A hydraulic power device usable to power a compactor ram of a waste compactor is provided. The hydraulic power device includes a pump assembly having first and second pumps for providing pressurized hydraulic fluid to at least one hydraulic cylinder and piston assembly associated with the compactor ram. A battery is provided for storing energy and for providing energy to the pump assembly. A solar panel converts solar energy and charges the battery. A pump control unit simultaneously operates the pumps when an operating pressure of the pump assembly is less than a predetermined threshold and operates only the first pump when the operating pressure of the pump assembly is greater than the predetermined threshold.

18 Claims, 7 Drawing Sheets

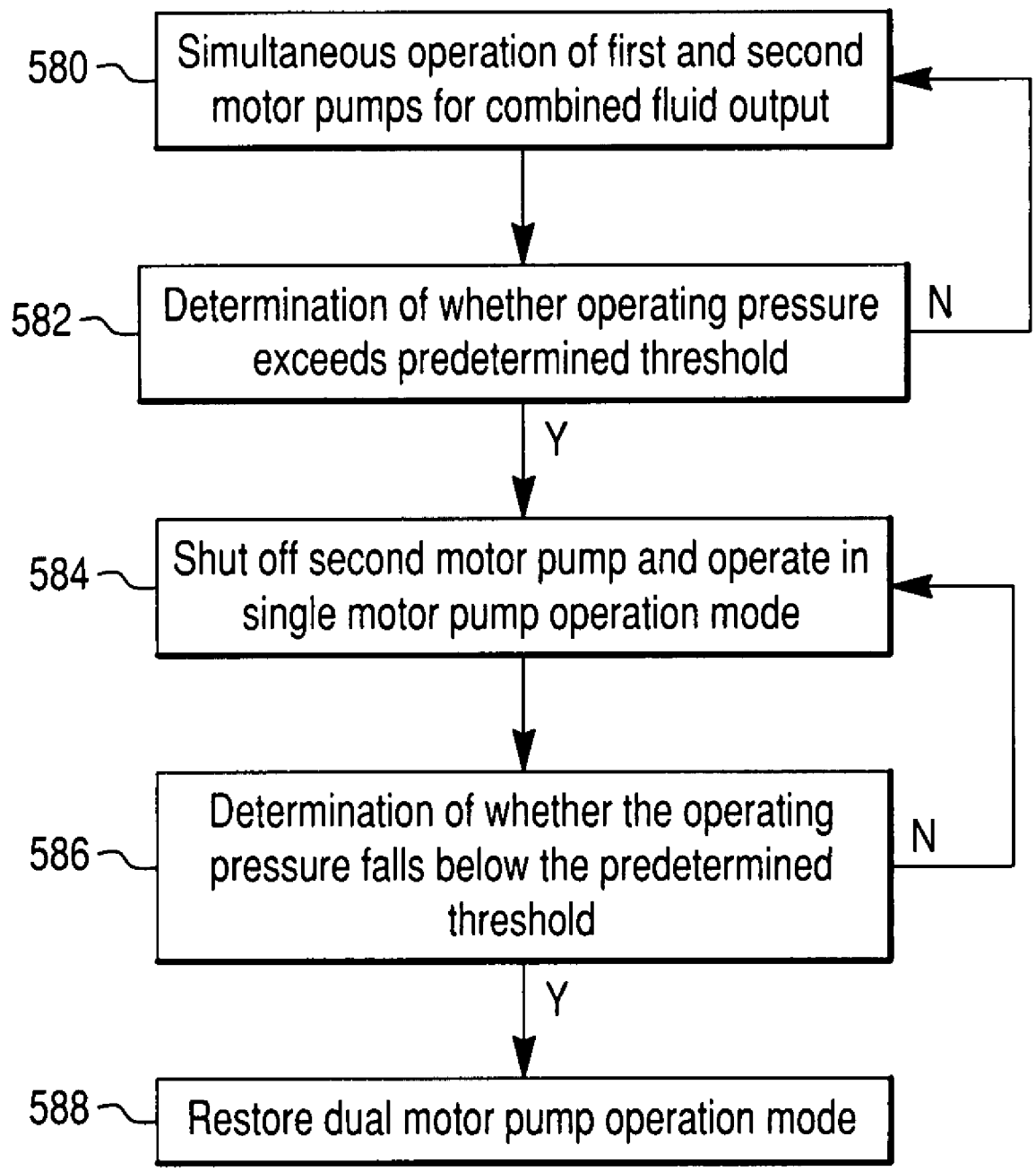

SOLAR-POWERED WASTE COMPACTOR, METHOD OF POWERING A WASTE COMPACTOR, AND HYDRAULIC UNIT THEREFOR

FIELD OF THE INVENTION

The present invention relates to a solar powered industrial waste compactor, a method of powering a waste compactor, and a hydraulic unit used therefor.

BACKGROUND OF THE INVENTION

There has been a continuing trend for people to visit parks, beaches, campsites, and like remote locations. Removal and disposal of waste from such locations is a continuing problem. Some locations require individuals to remove whatever waste they bring to a location in an effort to assist in keeping the location clean. While most people comply with these requirements, not all do. Waste compactors are used to minimize the volume of waste. Positioning industrial or large compactors at remote locations has not been feasible for various reasons including lack of suitable power.

Commercial, residential, and industrial use trash and waste compactors are known. These compactors typically include a container in which the trash or waste is compacted by a compacting rain driven by a power source.

Relatively small solar-powered trash compactors for home use are also known. However, the power units of these small compactors are not capable of effectively powering an industrial-sized waste compactor operated according to typical industrial compactor operation parameters and output requirements, such as operating pressure, cycle time, and output power. More specifically, industrial sized compactors typically require substantially more power than home or like small compactors. This is due to the fact that industrial sized compactors compact more waste, have larger compaction rains and typically operate more frequently than small compactors.

Accordingly, there is a need for an industrial waste compactor that is energy efficient and can be driven by solar power without compromising industrial compactor operation parameters and output requirements, such as operating pressure, cycle time, and output power.

Electric motors which are used to power industrial waste compactors typically require three phase power, because three phase power makes it possible to produce a rotating magnetic field. Additionally, a delay between phases of current has the effect of transferring constant power over each cycle of the current. However, other applications for three phase power are relatively few in number and there are various parts of the country in which three phase power is not available. For example, three phase power is typically not provided in any homes. Additionally, three phase power may be difficult to find in rural areas or may be a relatively long distance from where the compactor is to be located.

Accordingly, there is also a need for an industrial waste compactor that does not require three phase power, used in locations in which three phase power is not readily available and yet meets industrial waste compactor operating and throughput requirements.

SUMMARY OF THE INVENTION

A waste compactor system including a waste compactor and a hydraulic power device is provided. The waste compactor includes a waste container for housing waste and a compactor ram for compacting the waste in the waste container. The hydraulic power device is operably associated with and powers the compactor ram. The hydraulic power device includes a pump assembly including first and second pumps for providing pressurized hydraulic fluid to at least one hydraulic cylinder and piston assembly operably associated with the compactor ram. A battery is provided for storing energy and for providing energy to the pump assembly. A solar panel converts solar energy to charge the battery. A pump control unit simultaneously operates the pumps when an operating pressure of the pump assembly is less than a predetermined threshold and operates only the first pump when the operating pressure of the pump assembly is greater than the predetermined threshold.

A waste compactor system including a waste compactor and a hydraulic power device is provided. The waste compactor includes a waste container for housing waste and a compactor ram for compacting the waste in the waste container. The compactor ram has a compactor ram extending phase and a compactor ram retraction phase, which constitute a compactor duty cycle. The hydraulic power device is operably associated with and powers the compactor ram. The hydraulic power device includes a pump assembly having first and second pumps for providing pressurized hydraulic fluid to at least one hydraulic cylinder and piston assembly operably associated with the compactor ram. A battery is provided for storing energy and for providing energy to the pump assembly. A solar panel converts solar energy to charge the battery. A pump control unit, which includes a programmable logic controller (PLC), operates the pump assembly to provide an initial fluid output during a first portion of the compactor duty cycle and for operating said pump assembly to provide an alternate fluid output during a second portion of the compactor duty cycle.

A hydraulic power device usable to power a compactor ram of a waste compactor is also provided. The hydraulic power device includes a pump assembly including at least one pump for providing pressurized hydraulic fluid to at least one hydraulic cylinder and piston assembly associated with the compactor ram, a battery for storing energy and for providing energy to the pump assembly, and a solar panel for converting solar energy to charge the battery. A pump control unit simultaneously operates the pumps when an operating pressure of the pump assembly is less than a predetermined threshold and operates only the first pump when the operating pressure of the pump assembly is greater than the predetermined threshold.

A method of powering a compactor ram of a waste compactor is also provided. The method includes the steps of providing a pump assembly including first and second pumps for providing pressurized hydraulic fluid to at least one hydraulic cylinder and piston assembly associated with the compactor ram, simultaneously operating both pumps when an operating pressure of the pump assembly is less than a predetermined threshold, and operating only the first pump when the operating pressure of the pump assembly is greater than the predetermined threshold.

BRIEF DESCRIPTION OF THE DRAWINGS

FIG. 8 is a flow chart diagram illustrating a method of powering a waste compactor according to another embodiment of the present invention.

DETAILED DESCRIPTION OF THE INVENTION

Figure 1:
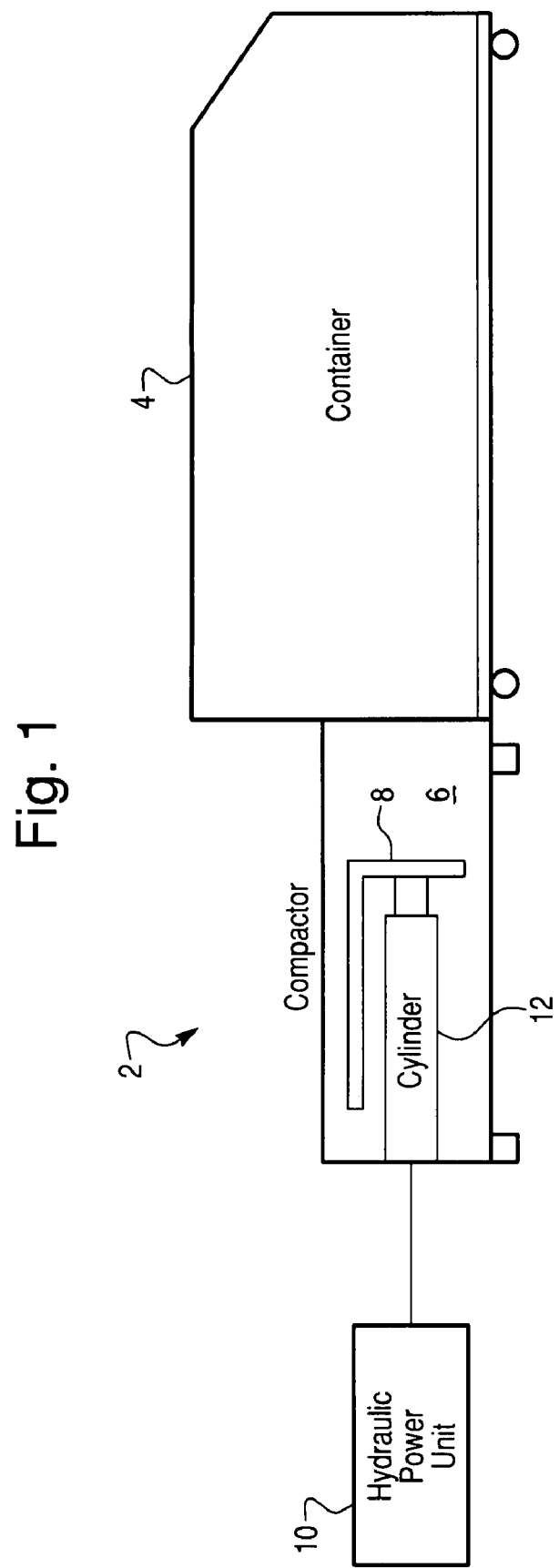
FIG. 1 is a schematic diagram illustrating a waste compactor and a hydraulic power unit according to an embodiment of the present invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

As best shown in FIG. 1, a waste compactor 2 includes a container 4, a charge box 6, and a compactor ram 8 which is reciprocated by a hydraulic power unit 10 to compact waste in the container 4. The compactor ram 8 is actuated by a hydraulic cylinder and piston assembly 12, which is operably associated with the hydraulic power unit 10 in order to allow reciprocation of the compactor ram 8 within the charge box 6.

Figure 2:
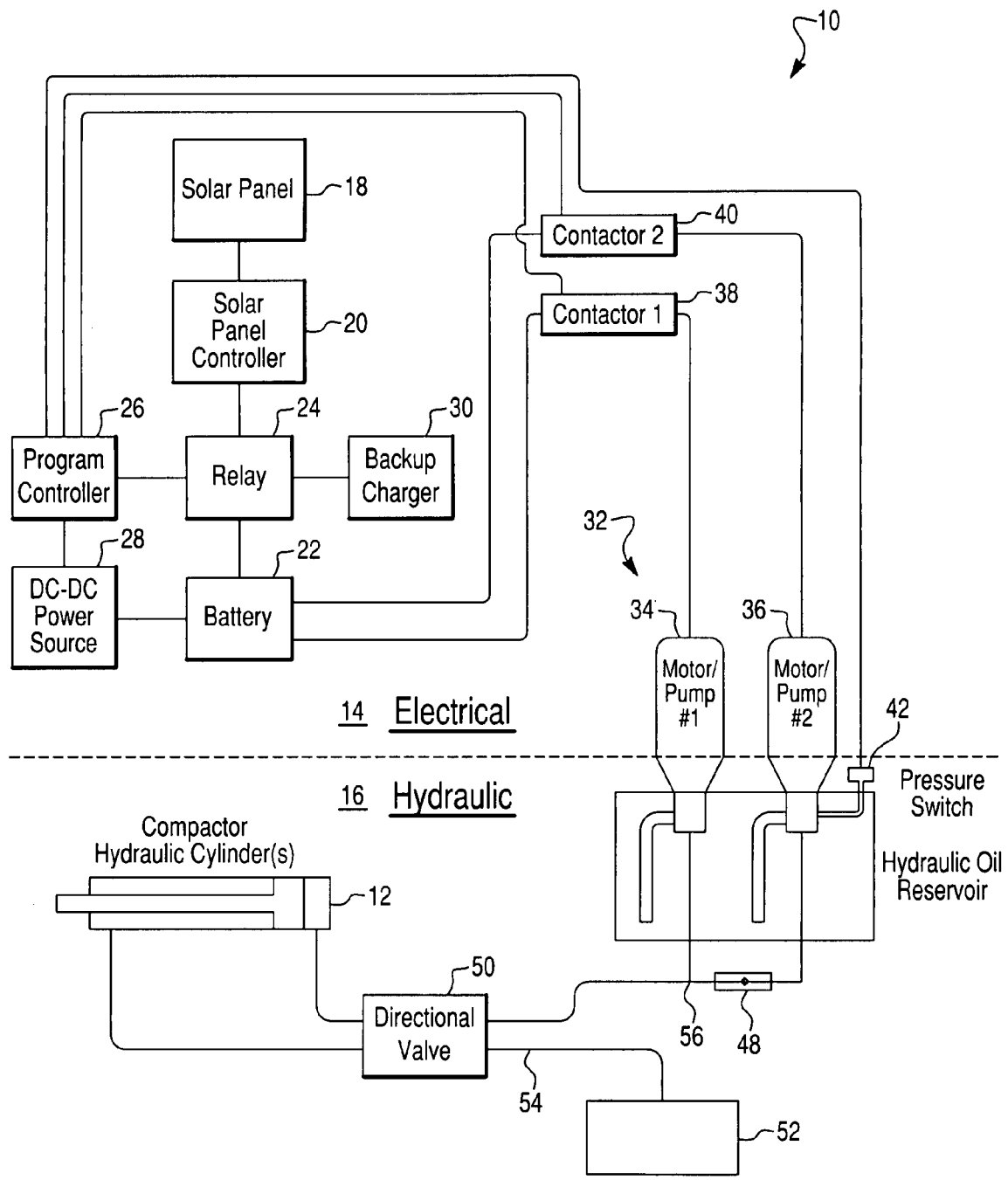
FIG. 2 is a schematic diagram illustrating the hydraulic power unit of FIG. 2.

As best shown in FIG. 2, the hydraulic power unit 10 includes an electrical circuit 14 and a hydraulic circuit 16. The electrical circuit 14 includes a solar panel 18 for converting solar energy into electrical energy. The solar panel 18 may be a 200 Watt solar panel. A solar panel controller 20 regulates electrical current generated by solar power from the solar panel 18. A battery unit 22 is provided with the electrical current harnessed by the solar panel 18 and stores energy to power the components of the hydraulic power unit 10. The battery unit 22 may be two 12V batteries arranged in series to obtain 24V DC. Alternatively, the battery unit 22 may be four 12V batteries for compactors that use a larger hydraulic fluid flow. A relay 24 relays the electrical energy from the solar panel controller 20 and provides it to the battery unit 22 to charge the battery unit 22.

A programmable logic controller (PLC) 26 controls overall operation of the hydraulic power unit 10. 24 volt DC power is provided by the battery unit 22 to the PLC 26. A DC-DC power source 28 stabilizes the voltage provided by the battery unit 22, which tends to fluctuate when the energy in the battery unit 22 is depleted. This fluctuation in voltage is due to the fact that the energy stored by the battery unit 22 is charged by the solar panel 18. Thus, even when the voltage from the battery unit 22 drops below 24V, erratic operation of the PLC 26 can be prevented. The DC-DC power source 28 is capable of stabilizing any input voltage within a predetermined voltage range, for example between 18 and 30 volts.

A backup charger 30 provides backup auxiliary power to the battery unit 22 when the solar panel 18 is not capable of providing sufficient power to the battery unit 22. The backup charger 30 is preferably a 110 volt charger that receives 110 volts as an input from any standard electrical outlet and outputs 24 volts at 20 amps of current. As a result, expensive three-phase power which is typically required by industrial waste compactors is not required.

The PLC 26 controls the relay 24 and causes it to switch between solar charging during the periods of sunlight and the backup charger 30 for periods when sunlight is lacking. The PLC 26 may have a timer and/or a voltage sensor that switches between the backup charger 30 and the solar panel 18 based on programmed hours of daylight or a voltage sensed at the battery unit 22.

The hydraulic circuit 16 includes a pump assembly 32 including a first motor driven pump 34 and a second motor driven pump 36. The first and second motor driven pumps 34 and 36 are preferably fixed displacement pumps. When the hydraulic power unit 10 is operated, the PLC 26 closes a first contactor 38 and a second contactor 40 to provide power from the battery unit 22 to the first and second motor driven pumps 34 and 36, respectively. In this operational state, the battery power from the battery unit 22 is shared by the first and second motor driven pumps 34 and 36 such that each motor driven pump 34 and 36 provides the hydraulic cylinder and piston assembly 12 of the compactor ram 8 with pressurized hydraulic fluid. In an exemplary embodiment of the present invention, each of the motor driven pumps 34 and 36 provides the hydraulic cylinder and piston assembly 12 with about 4 gallons per minute for a total of 8 gallons per minute of hydraulic fluid. The hydraulic power unit 10 operates the compactor ram 8 in this operational state when the operating pressure detected at pressure switch 42 is less than a predetermined pressure threshold.

If the operating pressure of the hydraulic power unit 10 exceeds the predetermined pressure threshold, the pressure switch 42 signals the PLC 26 to open the second contactor 40 so that only the first motor driven pump 34 is operated. In this operational state, the battery power is provided from the battery unit 22 to only the first motor driven pump 34 and less energy is drained from the battery unit 22. In other words, when the operating pressure is high and only one motor driven pump is performing all the work in this operational state, less amperage is drained from the battery unit 22. As a result, the energy from the battery unit 22 is used more efficiently and the solar energy harnessed from the solar panel 18 can provide sufficient energy to charge the battery unit 22 even while energy from the battery unit 22 is used to drive the hydraulic unit 10.

Switching between the two operational states allows high pressures typically used by industrial compactors to be utilized. For example, about 1850 pounds per square inch (psi) can be achieved by the hydraulic power unit 10 when the hydraulic power unit 10 switches from operating both motor driven pumps 34 and 36 to operating only the first motor driven pump 34.

The predetermined pressure threshold is set based on amperage curves and characteristics of the motor driven pumps 34 and 36 at different operating pressures. We have found that when the operating pressure is above the predetermined pressure threshold, the amperage required by the motor driven pumps 34 and 36 increased substantially. Thus, operating both motor driven pumps 34 and 36 above this predetermined pressure threshold drains a relatively large amount of power from the battery unit 22. A relatively large solar panel 18 would thus be required to provide more energy to the battery unit 22 if the compactor 2 were to be operated pursuant to standard operating and throughput specifications while using both motor drive pumps 34 and 36 for an extended period of time. Use of a single pump for a relatively short period thus minimizes power drain on the battery unit 22, thus reducing the size of the solar panel 18 and yet maintaining satisfactory and throughput requirements.

In an exemplary embodiment of the present invention, the predetermined pressure threshold is set to about 800 psi. However, it will be appreciated that the predetermined pressure threshold may be set to other values based on system output requirements and parameters.

It will be appreciated that as the operating pressure of the hydraulic power unit 10 increases, more current is necessary to drive the motor driven pumps 34 and 36. For example, when the operating pressure of the hydraulic power unit 10 is about 800 psi, each motor driven pump 34 and 36 uses about 100 amps of current from the battery unit 22. When the operating pressure of the hydraulic power unit 10 is about 1600 psi, each pump 34 and 36 uses about 165 amps of current from the battery unit 22. By switching to single pump operation when the operating pressure reaches 800 psi, current drained from the battery unit 22 can be limited to 165 amps throughout dual and single motor operation. Accordingly, battery power that would otherwise be exhausted at high operating pressure can be conserved.

The predetermined threshold may be set so that during about 80% of the duty cycle of the waste compactor 2, the operating pressure does not exceed the predetermined threshold, e.g. 800 psi. Referring to FIG. 1, the operating pressure of the waste compactor 2 is a function of (1) the load on the hydraulic cylinder and piston assembly 12, which at any given time depends on the amount of waste being compacted by the compactor ram 8 and the waste in the container 4, and (2) the phase of the duty cycle being performed, e.g. compactor ram extension or retraction. Thus, when the container 4 is relatively empty, the load on the compactor ram 8 is relatively low. Therefore, the operating pressure remains below 800 psi for most of the duty cycle. However, as the container 4 begins to fill with waste, the operating pressure tends to increase and may eventually exceed the predetermined pressure threshold, at which point the PLC 26 turns off the second motor driven pump 36. As those skilled in the art will appreciate, little resistance is encountered as the ram 8 is retracted by the cylinder and piston assembly 12, with the result that relatively low levels of hydraulic pressure are required.

Figure 3:
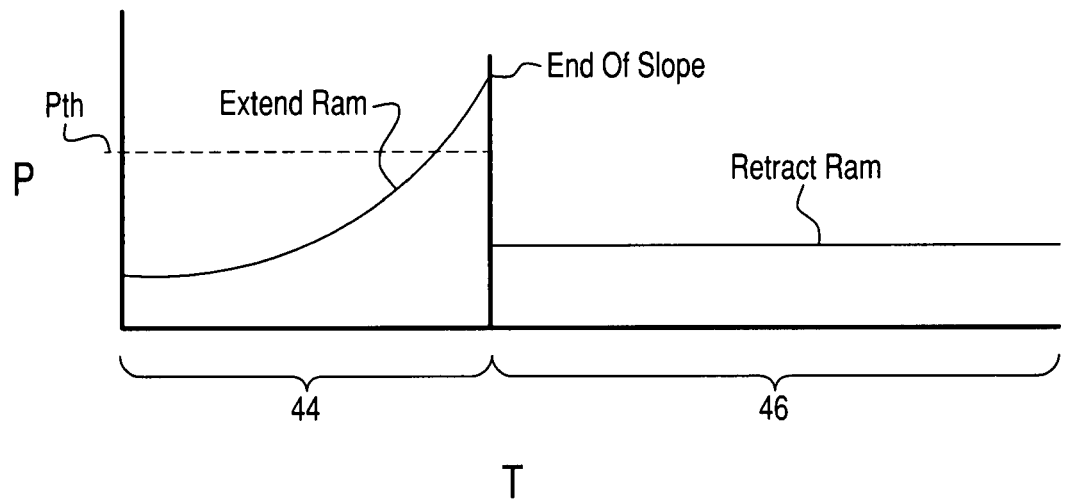
FIG. 3 is a timing diagram illustrating operating pressure of the hydraulic power unit over a duty cycle of the waste compactor of FIG. 1, according to another embodiment of the present invention.

As best shown by referring to FIGS. 1 and 3, the cycle time of waste compactor 2 typically includes two distinct pressure phases. The first pressure phase 44 occurs as the hydraulic cylinder and piston assembly 12 extend the compactor ram 8 through the charge box 6 towards the container 4. During this operation, the compactor ram 8 gradually encounters increased load as waste is compacted such that the operating pressure gradually and exponentially increases. The second pressure phase 46 occurs when the hydraulic cylinder and piston assembly 12 retracts the compactor ram 8 from the charge box 6 in order to allow additional waste to be deposited for compaction. In this case, there is no waste load and the operating pressure remains essentially constant. As can be seen from FIG. 3, during a majority of the cycle time, the operating pressure is less than the predetermined pressure threshold, which is represented in FIG. 3 by Pth. By switching from dual motor driven pump operation to single motor driven pump operation only when the predetermined pressure threshold Pth is reached, the work for compaction is performed at high operating pressures by the single motor driven pump for thereby minimizing energy drained from the battery unit 22.

During the dual motor operation mode, both motor driven pumps 34 and 36 provide hydraulic fluid to the hydraulic cylinder and piston assembly 12 to improve/speed-up the cycle time of the waste compactor 2. On the other hand, the single motor operation mode conserves energy of the battery unit 22 by decreasing the amount of current drawn from the battery unit 22 during the relatively short periods when high pressure is required to advance ram 8 in order to compact waste in container 4. Operation of a single motor driven pump reduces the fluid output of the hydraulic power unit 10, thereby reducing the speed of the compactor ram 8 toward the end of the compactor ram extending phase 44 shown in FIG. 3, i.e., when the operating pressure exceeds the predetermined pressure threshold Pth. However, because this decrease in output only occurs for a relatively short duration at the end of the compactor ram extending phase 44 of the duty cycle when the compactor ram 8 encounters the most load, it does not substantially adversely affect the cycle time. Additionally, because the pump assembly 32 is operated in the dual motor operation during the majority of the compactor duty cycle, i.e., when the operating pressure is less than the predetermined pressure threshold Pth, the increased hydraulic fluid output in the dual motor operation compensates for the temporary slowdown in fluid output that occurs during the single motor operation.

As best shown in FIG. 2, a check valve 48 is disposed between the output of the first and second motor driven pumps 34 and 36. The check valve 48 prevents hydraulic fluid from flowing toward the second motor driven pump 36 when the second motor driven pump 36 is shut off during singe motor operation. A directional control valve 50 controls the direction of fluid between the hydraulic cylinder and piston assembly 12 and the pump assembly 32 and between the hydraulic cylinder and piston assembly 12 and a fluid reservoir 52, thereby controlling advance and retraction of the piston and cylinder assembly 12. A return line 54 extends from the directional control valve 50 to the fluid reservoir 52.

During the dual motor driven pump operation mode, fluid output from both motor driven pumps 34 and 36 is combined at node 56 and is provided to the directional control valve 50. In this mode, as opposed to the single motor driven pump operation mode, two times as much fluid is output from the pump assembly 32 to the directional control valve 50. In an exemplary embodiment of the invention, about 8 gallons per minute is output by the pump assembly 32 in the dual motor driven pump operation mode, while about 4 gallons per minute is output by the pump assembly 32 in the single motor driven pump operation mode.

The hydraulic cylinder and piston assembly 12 may operate in the manner described in one or more of U.S. Pat. Nos. 5,178,062, 5,299,142, and 4,860,646, the contents of which are incorporated herein by reference. Additionally, the hydraulic power unit 10 may use a soy-based hydraulic fluid that is biodegradable and will not harm the environment.

Figure 4:
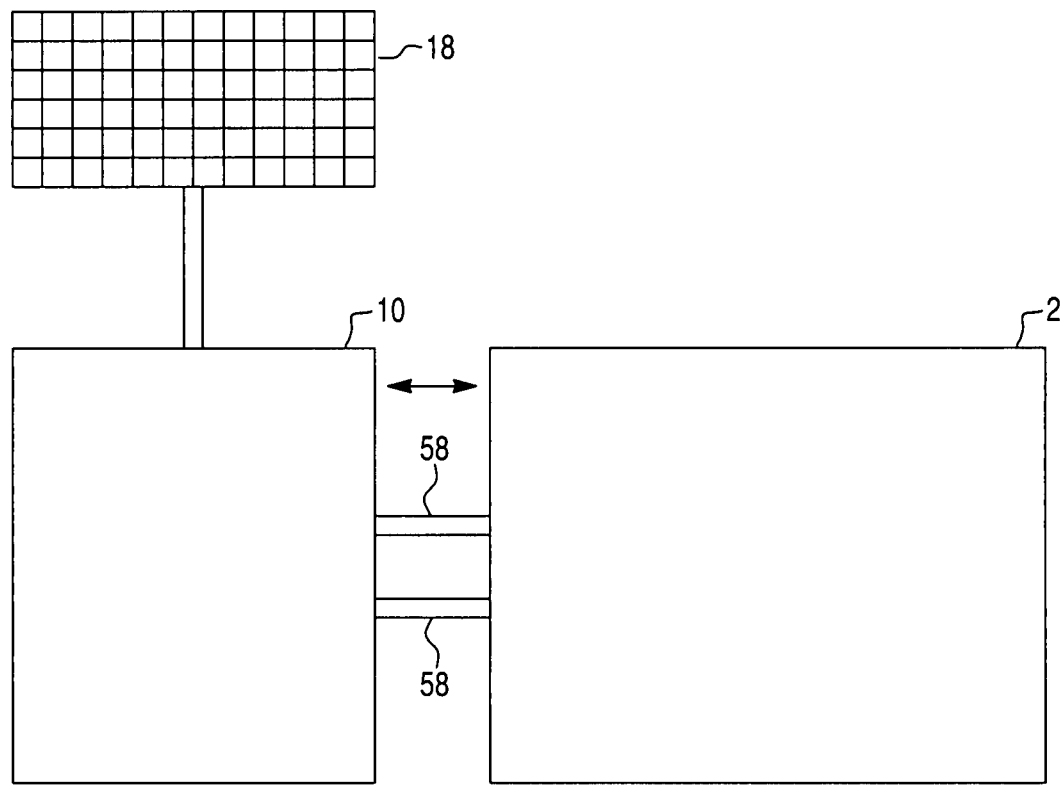
FIG. 4 illustrates the hydraulic power unit of FIG. 2 with a solar panel.

As best shown in FIG. 4, the waste compactor 2 is powered by the hydraulic power unit 10 associated with solar panel 18, which can be disposed on the hydraulic power unit 10 or mounted in a remote location. Hoses 58 can be provided to transfer pressurized hydraulic fluid between the hydraulic power unit 10 and the cylinder and piston assembly 12 contained within the compactor 2. The hoses 58 allow the hydraulic power unit 10 to be located remotely from the compactor 2. Likewise, the solar panel 18 may be located remotely from hydraulic unit 10 in order to obtain maximum exposure to solar energy.

The compactor 2 may be operated using intermittent duty cycles. For example, the hydraulic power unit 10 may operate the hydraulic cylinder and piston assembly 12 for one cycle including the compactor ram extending phase 44 and the compactor ram retracting phase 46 every 5 to 10 minutes, so that the solar panel 18 can charge the battery unit 22 between duty cycles.

Figure 5:
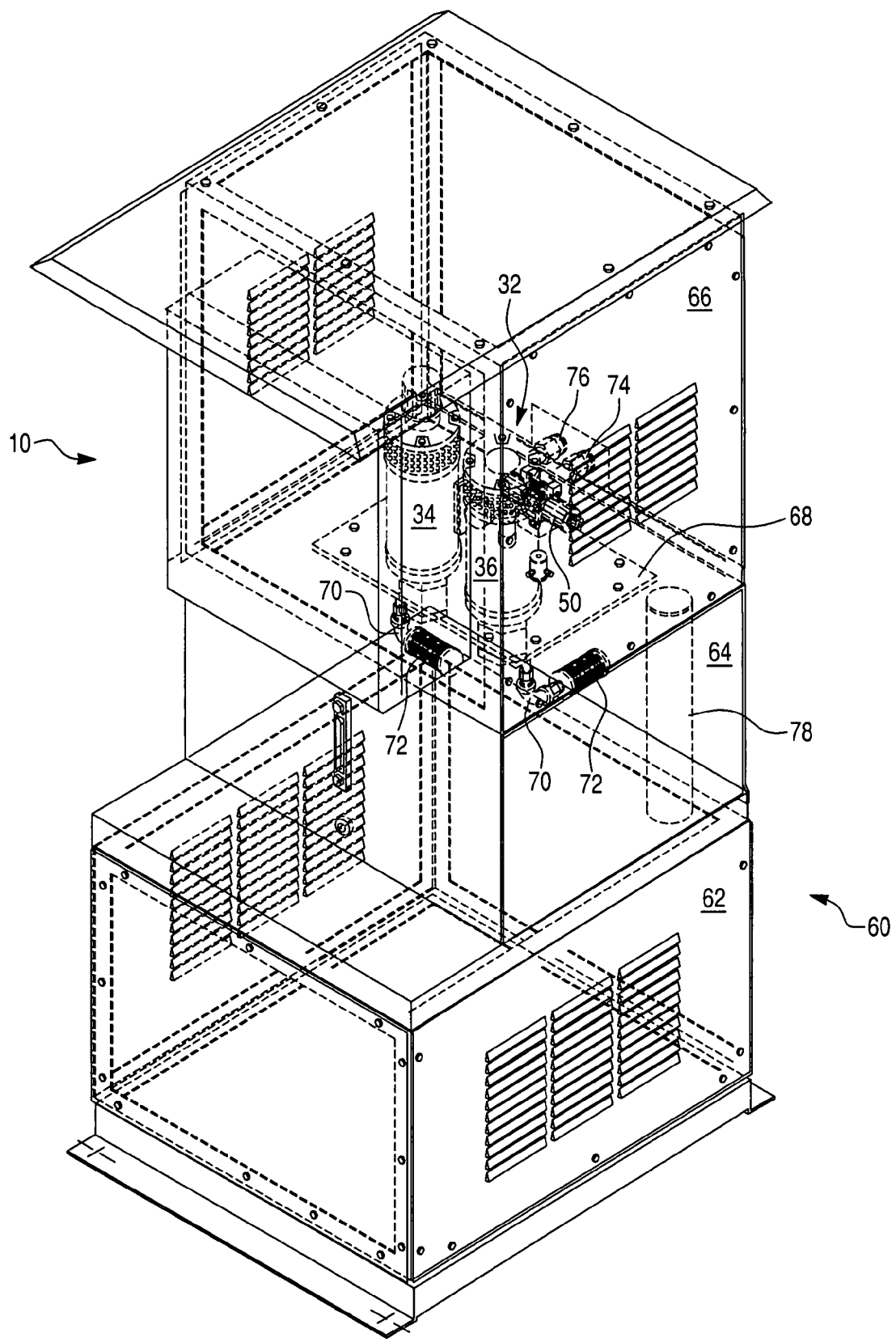
FIG. 5 is an exploded assembly view of the hydraulic power unit of FIG. 2 with portions shown in phantom.

As best shown in FIG. 5, the hydraulic power unit 10 includes a housing 60 having a battery section 62, a fluid reservoir section 64, and a pump section 66. The top portion of the pump section 66 of the housing 60 can support the solar panel 18 shown in FIG. 4. The solar panel 18 may be pivotably disposed on the housing 60 so as to maximize exposure to sunlight. Alternatively, the solar panel 18 may be mounted on a nearby building or pole.

Figure 6:
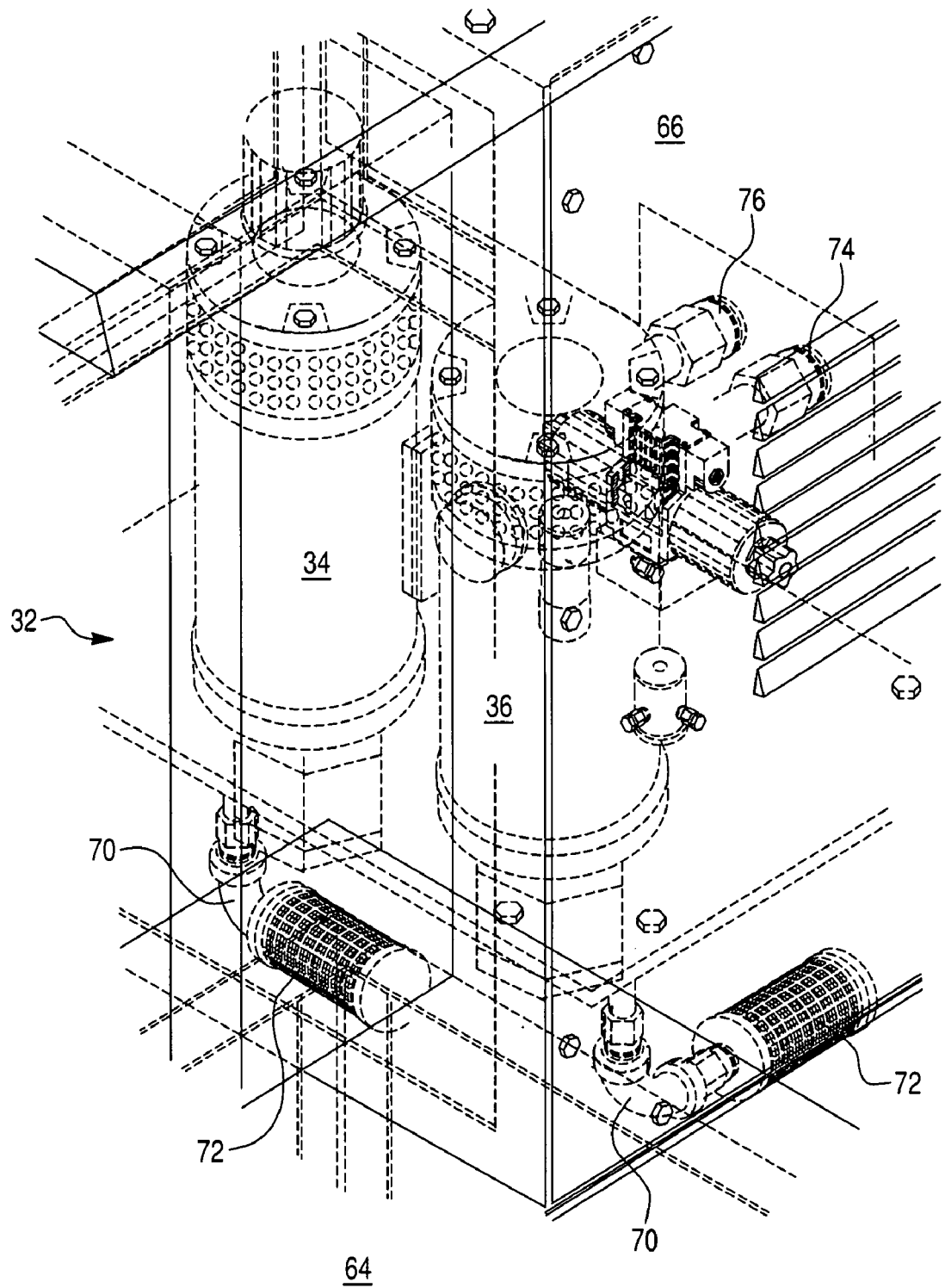
FIG. 6 is a top perspective view of a pump assembly of the hydraulic power unit of FIG. 5.
Figure 7:
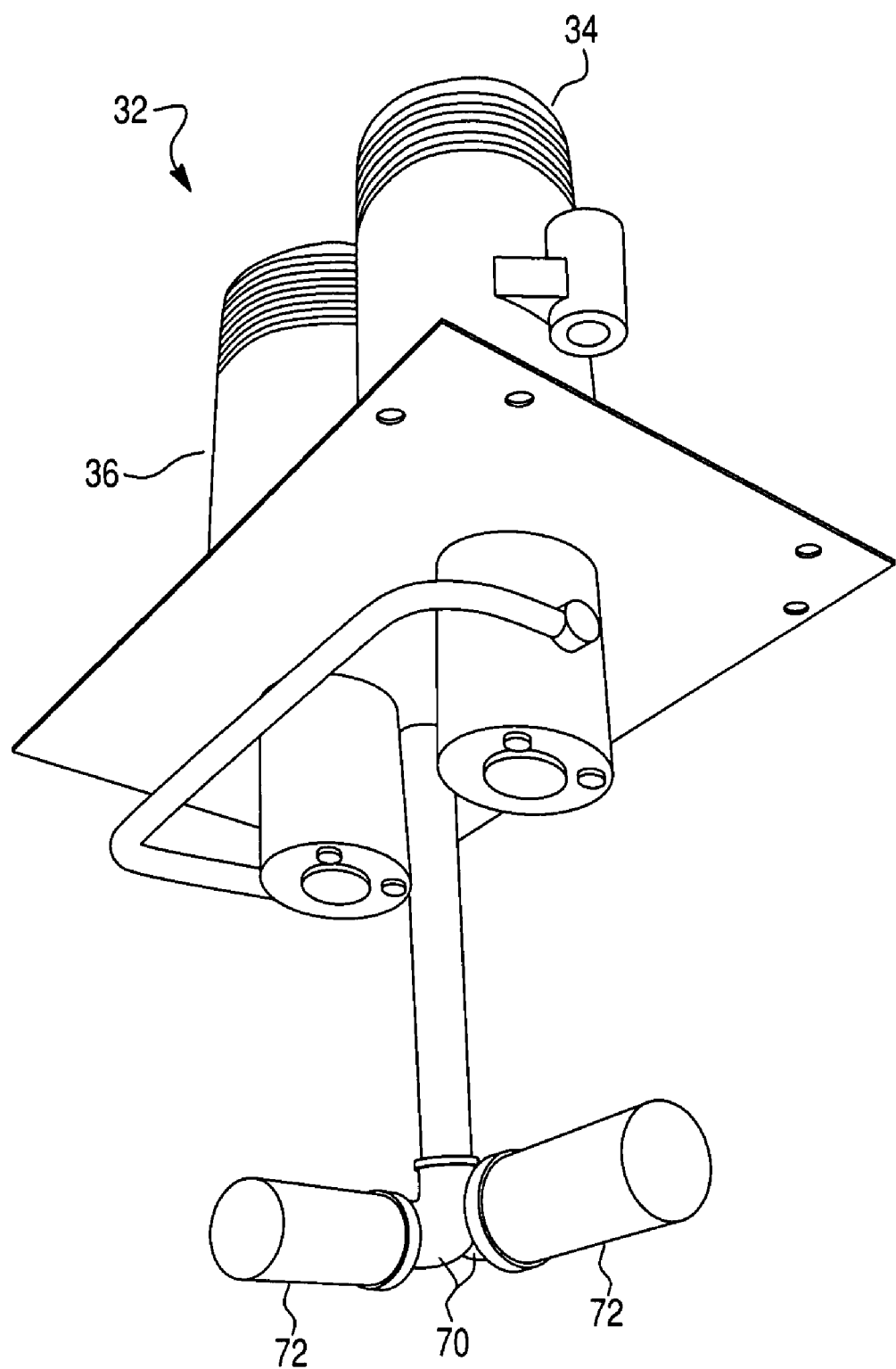
FIG. 7 is a bottom perspective view of the pump assembly of the hydraulic power unit of FIG. 5.

As best shown in FIGS. 5 through 7, a motor plate 68 supports the pump assembly 32 in the pump section 66. The motor plate 68 includes two holes in which the motor driven pumps 34 and 36 are supported. The pumps 34 and 36 include L-shaped inlet pipes 70 extending into the reservoir 52 (not shown in FIG. 5) in the reservoir section 64 and suction strainers 72 disposed on the ends of the inlet pipes 70. During operation, hydraulic fluid is drawn through the suction strainers 72 and inlet pipes 70 by operation of the corresponding motor driven pumps 34 and 36. The directional control valve 50 is connected to first and second fluid ports 74 and 76 on the housing 60. The fluid ports 74 and 76 are connected to the hoses 58 shown in FIG. 4 so as to transfer hydraulic fluid between the hydraulic power unit 10 and the compactor 2. During operation of the hydraulic power unit 10, one of the fluid ports 74 and 76 serves as a return port while the other one of the fluid ports 74 and 76 serves as the outlet port.

The reservoir section 64 houses the fluid reservoir 52 shown in FIG. 2, which stores hydraulic fluid. The battery section 62 houses the battery unit 22 shown in FIG. 2. A wiring tube 78 extends through the reservoir section 64 to house wiring (not shown) that extends between the battery section 62 and the pump section 66 to prevent the wiring from being exposed to the hydraulic fluid. Although not shown in FIGS. 5 through 7, the return line 54 (see FIG. 2) extends from the directional control valve 50 through the motor plate 68 to return fluid to the reservoir 52.

As best shown in FIG. 8, a method of powering a waste compactor includes simultaneously operating the first and second motor driven pumps 34 and 36 to produce a combined hydraulic fluid flow at step S80. At step S82, it is determined whether the operating pressure of the hydraulic power unit 10 meets or exceeds the predetermined pressure threshold. If in step S82 it is determined that the operating pressure of the hydraulic power unit 10 exceeds the predetermined pressure threshold (represented by "Y" at step S82), the PLC 26 shuts off the second motor driven pump 36 and operates the hydraulic unit 10 in the single motor driven pump operation mode at step S84. If in step S82 it is determined that the operating pressure of the hydraulic power unit 10 does not exceed the predetermined pressure threshold ("represented by "N" at step S82), the PLC 26 continues to operate the hydraulic power unit 10 in the dual motor driven pump operation mode in step S80.

When the hydraulic power unit 10 is operating in the single motor driven pump operation mode in step S84, it is determined whether the operating pressure has fallen below the predetermined pressure threshold in step S86. If the operating pressure is determined to have fallen below the predetermined pressure threshold in step S86 (represented by "Y"), the PLC 26 restores the dual motor driven pump operation mode in step S88. On the other hand, if the operating pressure is determined not to have fallen below the predetermined pressure threshold in step S86 (represented by "N"), single motor driven pump operation is continued at step S84.

As mentioned above, the operating pressure varies over the course of a compactor duty cycle in a manner approximated by the graph shown in FIG. 3. Thus, the steps in the method shown in FIG. 8 depend, at least in part, on the phase of the compactor duty cycle being performed by the compactor 2. Of course, it will be appreciated by one of ordinary skill in the art that other variations of the duty cycle or operating pressure patterns are possible.

The hydraulic power unit 10 of the embodiments of the present invention is able to power industrial sized waste compactors. Typically, industrial compactors tend to be relatively large and require substantially more power for compacting waste as compared with residential/commercial trash compactors. For example, industrial waste compactors can range anywhere between 40 inches and 240 inches in length or even longer, and may be about 60 inches in width.

Without necessarily wishing to be bound by any theory, it is believed that prior to the hydraulic power unit 10 of the embodiments of the present invention, solar power could not be used to efficiently and satisfactorily drive an industrial compactor, due to the substantial power and output requirements of these large industrial compactors. However, due to the operation of the pump assembly 32 in single and dual motor driven pump operation modes, the work performed by the hydraulic power unit 10 using solar energy harnessed by the solar panel 18 and stored in the battery unit 22 can be maximized during different phases of the duty cycle of the compactor 2.

Furthermore, the hydraulic power unit 10 does not require three phase power, which is typically required for operating industrial waste compactors. Because the backup charger 30 shown in FIG. 2 uses 110 volts, any standard power outlet can be used for backup charging the battery unit 22. The solar panel 18 in combination with the energy-efficient operation of the pump assembly 32 eliminates the need for three-phase power, thereby making it possible to use a 110 volt power source.

Additionally, although the hydraulic power unit 10 is shown and described above as being used with the solar panel 10, it should be understood that the pump assembly 32 of the present invention may be used to efficiently operate other hydraulic systems that do not include solar panel(s).

Finally, although the embodiments of the present invention have been described with reference to using solar power, it should be understood that the present invention may be used with other natural power sources, for example wind power, hydropower, etc.

Although a few embodiments of the present invention have been shown and described, it will be appreciated by those skilled in the art that changes may be made in these embodiments without departing from the principles and spirit of the invention, the scope of which is defined in the appended claims and their equivalents.

We claim:

1. A waste compactor system, comprising:
   a waste compactor including:
      a waste container for housing waste, and
      a compactor ram for compacting the waste in said waste container; and
   a hydraulic power device operably associated with and for powering said compactor ram, said device including:
      a pump assembly including first and second pumps for providing pressurized hydraulic fluid to at least one hydraulic cylinder and piston assembly operably associated with said compactor ram,
      a battery for storing energy and for providing energy to said pump assembly, a solar panel for converting solar energy to electrical energy to charge said battery, and a pump control unit for simultaneously operating said pumps when an operating pressure of said pump assembly is less than a predetermined threshold and for operating only said first pump when the operating pressure of said pump assembly is greater than the predetermined threshold.

2. The waste compactor system of claim 1, further comprising:

a backup charger for receiving a 110 volt input and for outputting a reduced voltage for said battery, said backup charger being operated to charge said battery at times when solar energy is not available.

3. The waste compactor system of claim 1, wherein said pump control unit comprises:

a pressure switch for detecting the operating pressure at said pump assembly; and a controller for controlling operation of said first and second pumps based on the detected operating pressure.

4. The waste compactor system of claim 1, further comprising:

a first output line output from said first pump;

a second output line output from said second pump;

a node at which fluid from said first and second output lines is combined;

a check valve disposed between said second output line and said node for preventing backflow of fluid to said second pump;

a directional control valve coupled to at least one output line and at least one return line for controlling an output direction of the combined fluid from said node to control fluid flow to said hydraulic cylinder and piston assembly for extending and retracting said compactor ram; and a reservoir for receiving returned fluid from said return line.

5. The waste compactor system of claim 1, further comprising:

a housing including:

a battery section for housing said battery;

a reservoir section for housing a reservoir for temporarily storing hydraulic fluid; and a pump section for housing said pump assembly and a directional control valve to control fluid output from said pump assembly, said pump section of said housing having at least one inlet/outlet port disposed in a panel thereof.

6. The waste compactor system of claim 5, wherein said reservoir section is disposed above said battery section and below said pump section, and said reservoir section includes a pipe extending therethrough for allowing wiring from said battery to extend through said reservoir section into said pump section to power said pump assembly.

7. The waste compactor system of claim 5, wherein said solar panel is mounted on an outer panel of said pump section of said housing.

8. The waste compactor system of claim 7, wherein said solar panel is pivotally mounted on a top surface of said pump section of said housing.

9. The waste compactor system of claim 5, further comprising:

a motor plate disposed between said pump section and said reservoir section of said housing, said motor plate including two holes to accommodate said first and second pumps, respectively.

10. The waste compactor system of claim 1, wherein when said hydraulic power device is initially turned on, said pump control unit operates said pump assembly to extend the compactor ram until said predetermined pressure threshold is reached then turns off said second pump and operates said first pump to continue to increase operating pressure until a maximum pressure is reached, at which point said pump assembly is operated to retract the compactor ram.

11. The waste compactor system of claim 1, further comprising:

a DC-DC power source disposed between said battery and said pump control unit, said DC-DC power source stabilizing a voltage provided from said battery.

12. The waste compactor system of claim 1, wherein said hydraulic fluid is a soy-based fluid.

13. The waste compactor system of claim 1, wherein said hydraulic power unit is located remotely from said waste compactor.

14. The waste compactor system of claim 1, further comprising:

at least one hose connected between said hydraulic cylinder and piston assembly of said waste compactor and said hydraulic power unit for transferring hydraulic fluid therebetween.

15. A waste compactor system, comprising:

a waste compactor including:

a waste container for housing waste, and a compactor ram for compacting the waste in said waste container, said compaction ram having a compactor ram extending phase and a compactor ram retraction phase which constitute a compactor duty cycle; and a hydraulic power device operably associated with and for powering said compactor ram, said device including:

a pump assembly including first and second pumps for providing pressurized hydraulic fluid to at least one hydraulic cylinder and piston assembly operably associated with the compactor ram, a battery for storing energy and for providing energy to said pump assembly, a solar panel for converting solar energy to charge said battery, and a pump control unit for operating said pump assembly to provide an initial fluid output during a first portion of the compactor duty cycle and for operating said pump assembly to provide an alternate fluid output during a second portion of the compactor duty cycle.

16. The waste compactor system of claim 15, wherein the initial fluid output is about double the alternate fluid output.

17. The waste compactor system of claim 15, wherein said pump assembly comprises:

the first pump for constant operation by said pump control unit; and the second pump for operation by said pump control unit when the operating pressure is below a predetermined threshold.

18. A hydraulic power device usable to power a compactor ram of a waste compactor, said device comprising:

a pump assembly including first and second pumps for providing pressurized hydraulic fluid to at least one hydraulic cylinder and piston assembly associated with the compactor ram;

a battery for storing energy and for providing energy to said pump assembly;

a solar panel for converting solar energy to charge said battery; and a pump control unit for simultaneously operating said pumps when an operating pressure of said pump assembly is less than a predetermined threshold and for operating only said first pump when the operating pressure of said pump assembly is greater than the predetermined threshold.

* * * * *